(12) United States Patent
Wertzberger et al.

(10) Patent No.: US 12,221,829 B2
(45) Date of Patent: Feb. 11, 2025

(54) APPLIANCE DOOR SYNCHRONIZING MECHANISM

(71) Applicant: The Steelstone Group LLC, Brooklyn, NY (US)

(72) Inventors: Kalman Wertzberger, Brooklyn, NY (US); Meilech Friedman, Brooklyn, NY (US); Joseph Deutsch, Brooklyn, NY (US); Binyumen Itzkowitz, Brooklyn, NY (US); Robyn De Luca, Queens, NY (US); Wenhui Huang, Brooklyn, NY (US); Naphtali Biegeleisen, Brooklyn, NY (US)

(73) Assignee: The Steelstone Group LLC, Brooklyn, NY (US)

( * ) Notice: Subject to any disclaimer, the term of this patent is extended or adjusted under 35 U.S.C. 154(b) by 322 days.

(21) Appl. No.: 17/590,505

(22) Filed: Feb. 1, 2022

(65) Prior Publication Data
US 2022/0243528 A1 Aug. 4, 2022

Related U.S. Application Data

(60) Provisional application No. 63/145,115, filed on Feb. 3, 2021.

(51) Int. Cl.
*E06B 5/00* (2006.01)
*A47J 37/06* (2006.01)
(Continued)

(52) U.S. Cl.
CPC .............. *E06B 7/28* (2013.01); *A47J 37/06* (2013.01); *E05F 17/00* (2013.01); *E05F 2017/008* (2013.01)

(58) Field of Classification Search
CPC ........ E06B 7/28; A47J 37/06; E05F 2017/008
(Continued)

(56) References Cited

U.S. PATENT DOCUMENTS 370,849 A 10/1887 Baxter
862,602 A 8/1907 Baxter
(Continued)

FOREIGN PATENT DOCUMENTS

CN 213828212 U 7/2021
DE 102019119772 A1 1/2021

OTHER PUBLICATIONS

International Search Report with written opinion issued by the Russian Patent Office for International Patent Application No. PCT/US2022/014739, mailed on May 12, 2022.
(Continued)

*Primary Examiner* — Avinash A Savani
(74) *Attorney, Agent, or Firm* — Myers Wolin, LLC

(57) ABSTRACT

A door synchronizing assembly is provided having two doors for closing an opening to an enclosure, such as an oven cavity. Each door has a hinged outer edge at which the corresponding door pivots relative to the housing of the enclosure and a fixation point. A central linkage is provided adjacent a surface of the housing of the enclosure. The central linkage translates substantially in a direction perpendicular to a plane of the opening of the enclosure. As such, the central linkage translates towards and away from the door opening. First and second rigid elongated elements are provided, each of which link the central linkage with the fixation point of a corresponding door of the two doors. Movement of one of the two doors causes a translation of the central linkage which in turn generates a corresponding movement of the second of the two doors.

13 Claims, 7 Drawing Sheets

(51) Int. Cl.
  *E05F 17/00*  (2006.01)
  *E06B 7/28*  (2006.01)
(58) Field of Classification Search
  USPC .......................................................... 126/192
  See application file for complete search history.

(56) References Cited

U.S. PATENT DOCUMENTS

| | | | |
|---|---|---|---|
| 1,072,809 A | | 9/1913 | Baxter |
| 1,570,641 A | | 1/1926 | Perkins |
| 2,465,555 A | | 6/1946 | Smith |
| 2,708,709 A | * | 5/1955 | Pearce .................... F24C 15/30 |
| | | | 49/113 |
| 2,879,370 A | | 3/1959 | Kesling |
| 5,061,022 A | | 10/1991 | Meriwether |
| 7,814,897 B2 | * | 10/2010 | Larsen .................. F24C 15/023 |
| | | | 292/201 |
| 8,226,180 B2 | * | 7/2012 | Patil ...................... E05F 17/004 |
| | | | 49/109 |
| 8,510,991 B2 | | 8/2013 | Collene |
| 10,018,364 B2 | | 7/2018 | Yantis et al. |
| 2007/0039605 A1 | | 2/2007 | Larsen |
| 2007/0246036 A1 | * | 10/2007 | Larsen .................. F24C 15/021 |
| | | | 126/190 |
| 2009/0145031 A1 | | 6/2009 | Collene |
| 2014/0070681 A1 | | 3/2014 | Yantis et al. |

OTHER PUBLICATIONS

The European Search report issued by the European Patent Office for European Patent Application No. 22750251, dated Oct. 7, 2024.

\* cited by examiner

APPLIANCE DOOR SYNCHRONIZING MECHANISM

CROSS-REFERENCE TO RELATED APPLICATIONS

This application claims the benefit of U.S. Application 63/145,115, filed Feb. 3, 2021, the contents of which are incorporated herein by reference.

FIELD

The present disclosure generally relates to a mechanism for synchronizing the opening and closure of doors on an appliance. In particular, the disclosure relates to synchronized French door mechanisms for ovens.

BACKGROUND

Kitchen appliances may be provided with a variety of door types. In the case of ovens, traditional doors open as a single door that pivots downwards about a horizontal axis. That is, in a typical oven the oven door is pulled outwards from an oven enclosure and is lowered into a substantially horizontal position to provide access to an interior of the oven. When closed, the single oven door covers an opening of the enclosure.

This arrangement results in a door that extends a substantial distance from the oven when open. This distance must be taken into account when designing a kitchen, as an open door may interfere with human traffic patterns. This is particularly true where an island is present, or where a kitchen is a galley style kitchen. Further, during use, when placing items in the oven or removing items from the oven, a user must reach across the open oven door. Moving items across this threshold may be difficult when items are heavy, and it may be dangerous when items are hot.

Some ovens therefore incorporate horizontally opening doors, such as French doors. Such French door systems typically include two doors hinged at outer edges of an opening of the oven enclosure, and may include mechanisms for synchronizing the opening of the two doors, so that if one door is opened by a user, both oven doors open.

There is a need for improved and simplified door synchronizing assemblies for French door appliances.

SUMMARY

In some embodiments, a door synchronizing assembly is provided having two doors for closing an opening to an enclosure, such as an oven cavity. Each door has a hinged outer edge at which the corresponding door pivots relative to the housing of the enclosure and a fixation point.

A central linkage is provided adjacent a surface of the housing of the enclosure. The central linkage translates substantially in a direction perpendicular to a plane of the opening of the enclosure. As such, the central linkage translates towards and away from the door opening.

First and second rigid elongated elements are provided, each of which link the central linkage with the fixation point of a corresponding door of the two doors.

Movement of one of the two doors causes a translation of the central linkage which in turn generates a corresponding movement of the second of the two doors.

In some embodiments, the enclosure is an oven and the two doors are oven doors.

In some embodiments, the central linkage is located on or is fixed toa first end of a third rigid elongated element. The third rigid elongated element is fixed at or adjacent a side wall of the housing of the enclosure at a second end of the third rigid elongated element. As such, the translation of the central linkage corresponds to a pivot of the third rigid elongated element about its second end. The central linkage therefore follows an arc while translating substantially in the perpendicular direction.

In some such embodiments, the central linkage comprises two pivot points adjacent the first end of the third rigid elongated element. Each of the first and second rigid elongated elements pivot relative to the central linkage.

In some such embodiments, when one of the two doors is moved, the first and second rigid elongated elements pivot in opposite directions relative to the central linkage.

In some embodiments, movement of the central linkage generated by the movement of one of the two doors is in an arc about the second end of the third rigid elongated element. Such an arc approximates a translation perpendicular to the plane of the opening of the enclosure.

In some such embodiments, the central linkage has two pivot points adjacent the first end of the third rigid elongated element. A first of the two pivot points is closer to the second end than a second of the two pivot points, and each of the first and second rigid elongated elements pivot relative to a corresponding pivot point of the two pivot points. In some such embodiments, the two doors may open at different speeds due to different radial distances of each of the pivot points from the second end of the third rigid elongated element.

In some embodiments, the central linkage comprises two pivot points adjacent the first end of the third rigid elongated element. A first of the two pivot points is closer to the second end than the second of the two pivot points, and each of the first and second rigid elongated elements pivot relative to a corresponding pivot point of the two pivot points. In some such embodiments, a first distance between the fixation point of a first of the two doors and a hinged outer edge of the corresponding door is different than a second distance between the fixation point of a second of the two doors and a hinged outer edge of the corresponding door.

In some such embodiments, the fixation point of the second door is linked to the second pivot point by the second rigid elongated element, and the second distance is greater than the first distance.

In some embodiments, the fixation point of each door is adjacent the hinged outer edge of the corresponding door.

In some embodiments, such as in the case of an oven door, the central linkage may be outside of the enclosure, and may then be adjacent a top surface of the housing of the enclosure. In some embodiments, one of the two doors may further comprise a lip for sealing the one of the two doors against the second of the two doors. Such a lip may be located at an inner surface of the one of the two doors comprising the lip. The central linkage may then be configured to close the one of the two doors comprising the lip before closing the second of the two doors.

In some embodiments, the one of the two doors comprising the lip may have such a lip located at an outer surface of the corresponding door. In such an embodiment, the central linkage may then be configured to close the one of the two doors comprising the lip after closing the second of the two doors.

DETAILED DESCRIPTION OF THE PREFERRED EMBODIMENTS

Figure 1:
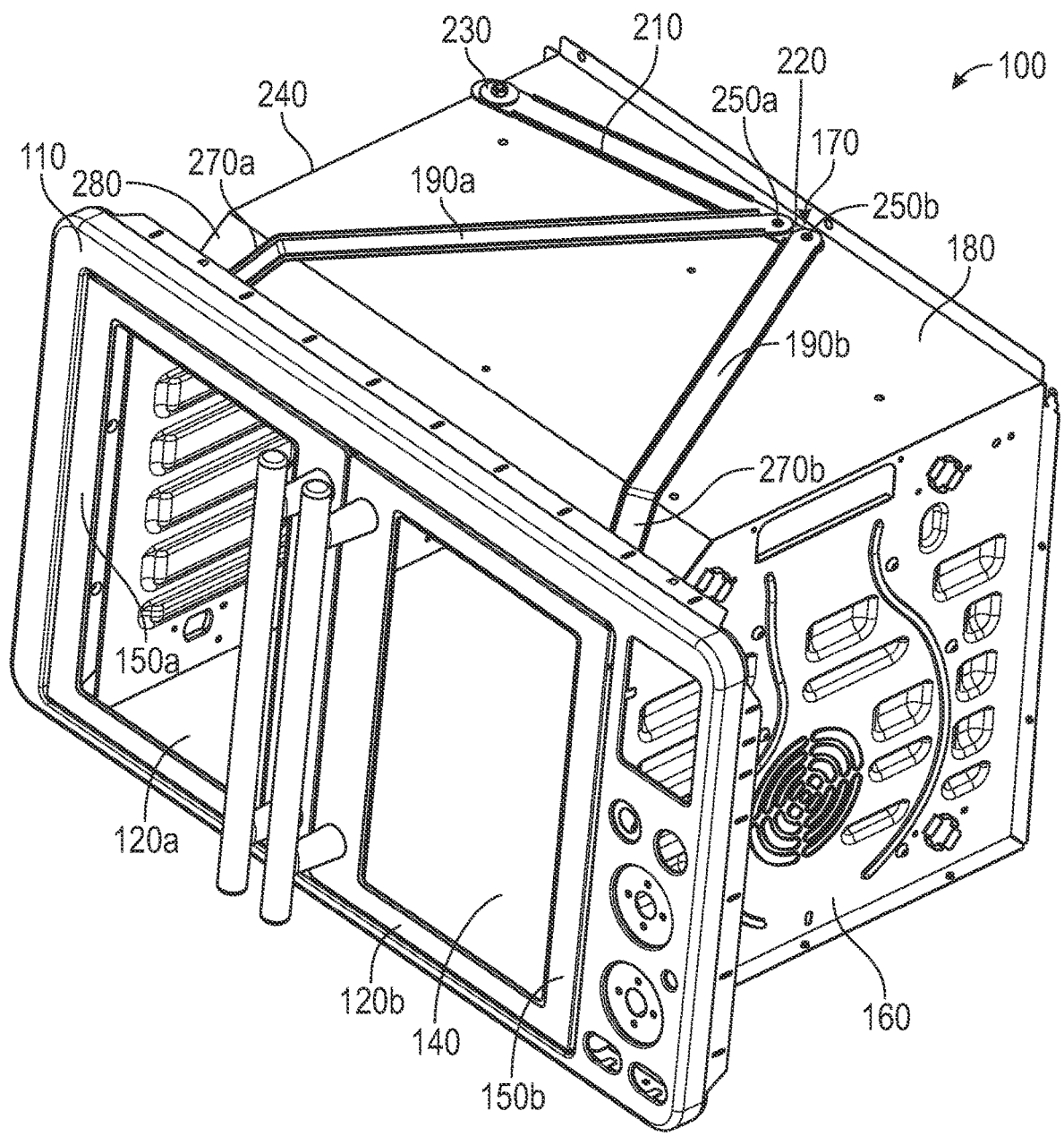
FIG. 1 shows a perspective view of a French door oven incorporating a synchronizing mechanism.

The description of illustrative embodiments according to principles of the present disclosure is intended to be read in connection with the accompanying drawings, which are to be considered part of the entire written description. In the description of embodiments of the disclosure disclosed herein, any reference to direction or orientation is merely intended for convenience of description and is not intended in any way to limit the scope of the present disclosure. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the disclosure are illustrated by reference to the exemplified embodiments. Accordingly, the disclosure expressly should not be limited to such exemplary embodiments illustrating some possible non-limiting combination of features that may exist alone or in other combinations of features; the scope of the disclosure being defined by the claims appended hereto.

This disclosure describes the best mode or modes of practicing the disclosure as presently contemplated. This description is not intended to be understood in a limiting sense, but provides an example of the disclosure presented solely for illustrative purposes by reference to the accompanying drawings to advise one of ordinary skill in the art of the advantages and construction of the disclosure. In the various views of the drawings, like reference characters designate like or similar parts.

It is important to note that the embodiments disclosed are only examples of the many advantageous uses of the innovative teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality.

Figure 2:
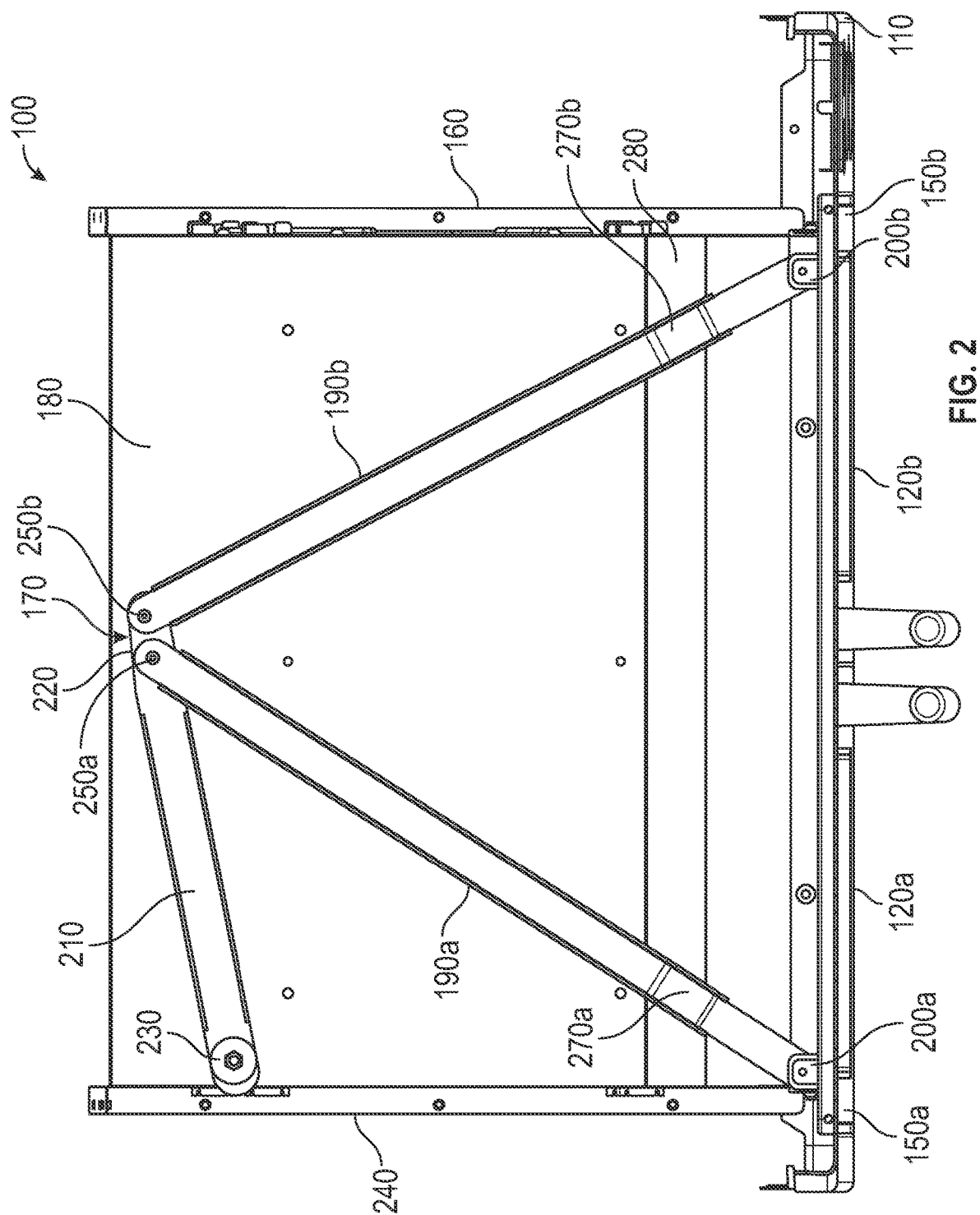
FIG. 2 shows a top view of the French door oven of FIG. 1 with a top lip of a front panel removed.
Figure 3:
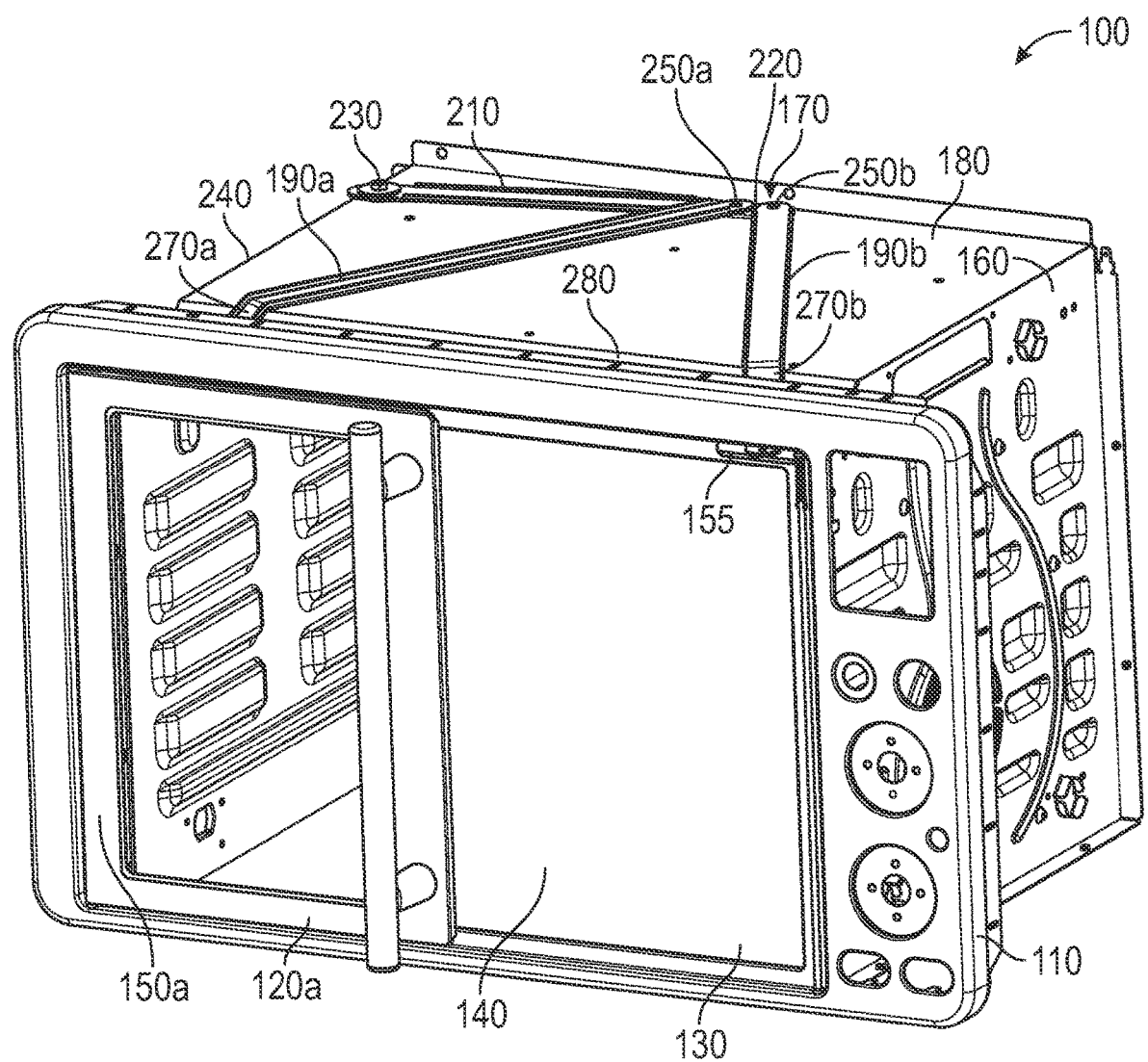
FIG. 3 shows a perspective view of the French door oven of FIG. 1 with a door removed.

FIG. 1 shows a perspective view of a French door oven 100 incorporating a synchronizing mechanism. FIG. 2 shows a top view of the French door oven 100 of FIG. 1 with a top lip of a front panel 110 removed. FIG. 3 shows a perspective view of the French door oven 100 of FIG. 1 with a door 120b removed. FIGS. 4A-D show a top view of the French door oven 100 of FIG. 1 while being opened.

As shown, the French door oven 100 includes a door synchronizing assembly configured such that when either of two doors 120a, b of the oven is opened, both doors are opened simultaneously by the mechanism. As such, the oven 100 has an oven enclosure 140 with an opening 130 closed by the two doors 120a, b. Each door 120a, b is mounted in a front panel 110 of the oven 100 and has a hinged outer edge 150a, b at which the corresponding door pivots relative to a housing 160 of the enclosure 140.

The French door oven 100 further comprises a central linkage 170 adjacent a surface 180 of the housing 160 of the enclosure 140. The central linkage 170 is translatable substantially in a direction substantially perpendicular to a plane of the opening 130 of the oven enclosure 140. As will be discussed below, this translation may be in an arc that 255 that generally approximates a linear translation perpendicular to the plane of the opening 130.

Two rigid elongated elements 190a, b each link the central linkage 170 with corresponding fixation points 200a, b on the corresponding oven doors 120a, b. As shown, the fixation points 200a, b are typically located on the corresponding doors 120a, b adjacent the corresponding hinged outer edge 150a, b. As shown in FIGS. 2 and 3, the fixation points 200a, b may extend from an interior surface of the correspond doors 120a, b, and may thereby extend through corresponding openings 155 in the front panel 110 of the enclosure 140 when the corresponding door is closed.

Figure 4A:
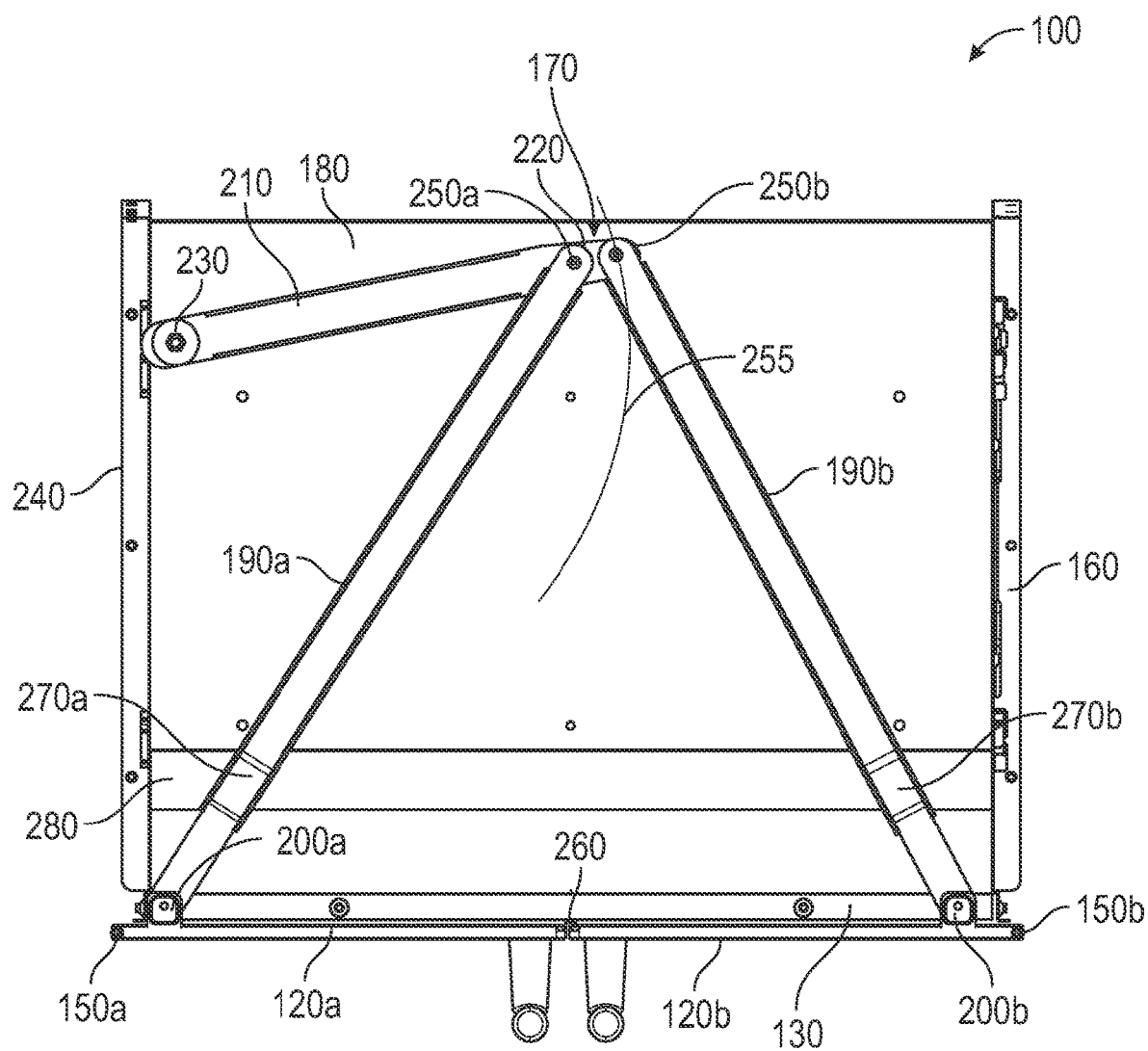
FIGS. 4A-D show a top view of the French door oven of FIG. 1 while being opened.
Figure 4B:
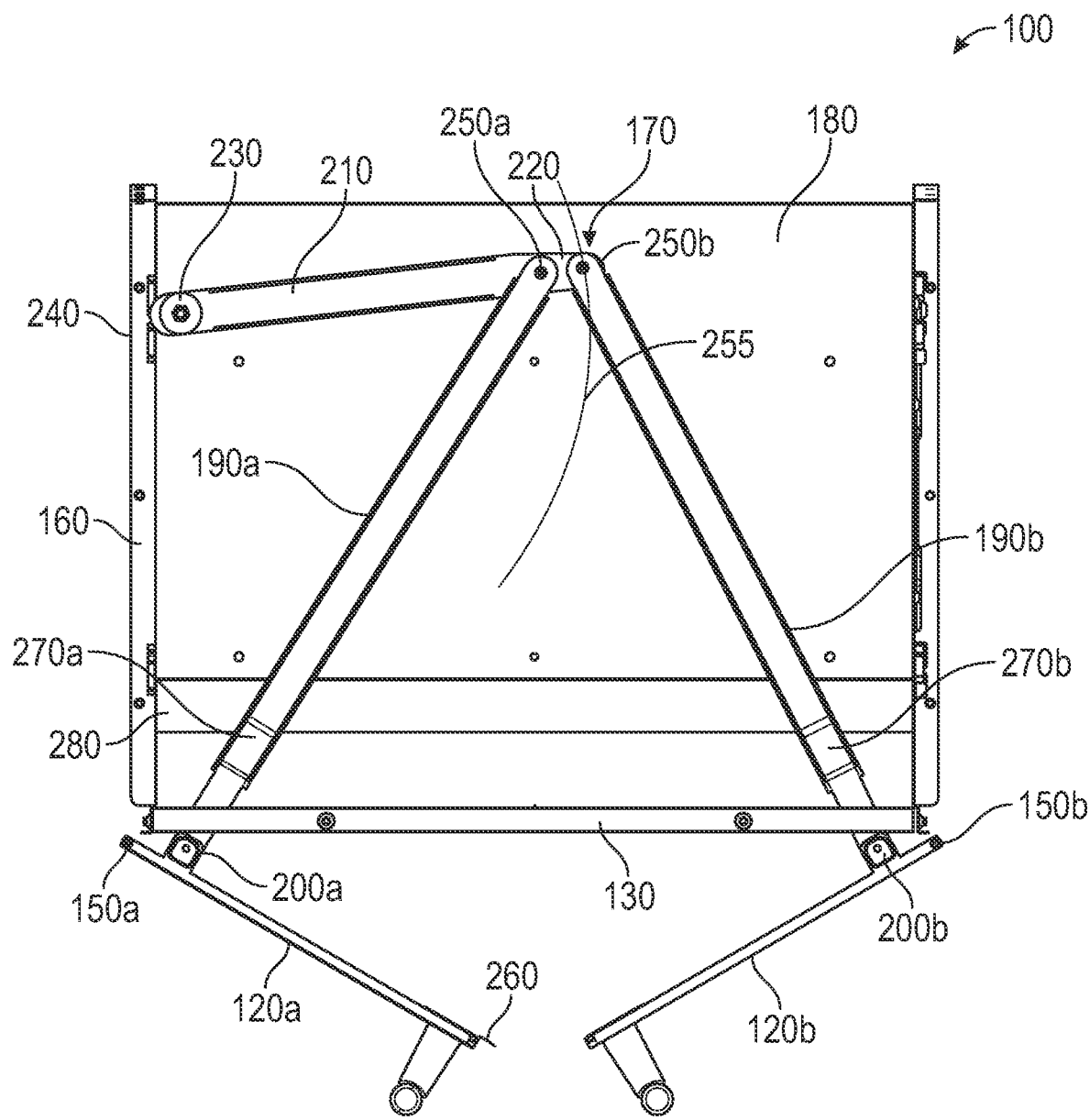
Figure 4C:
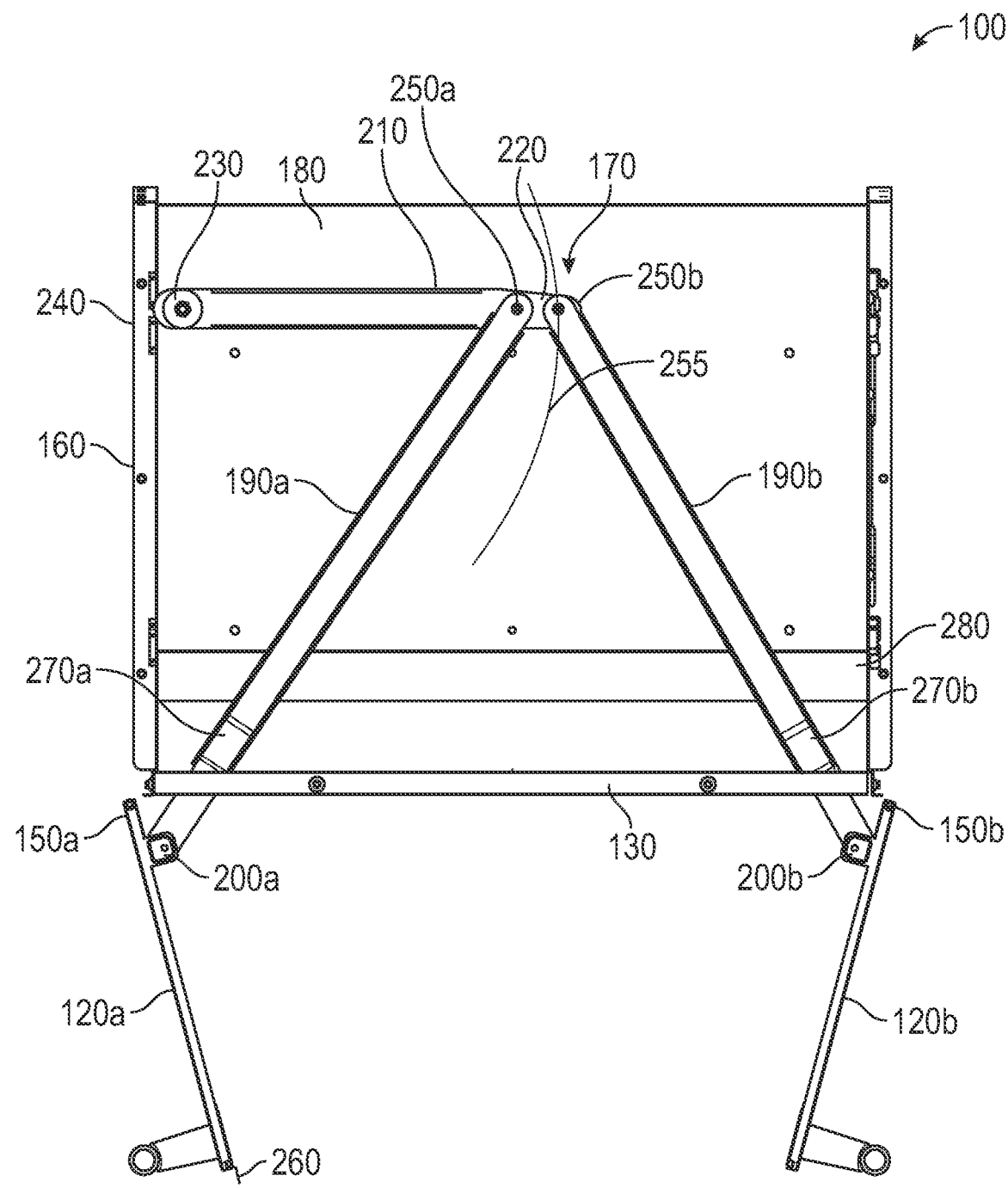
Figure 4D:
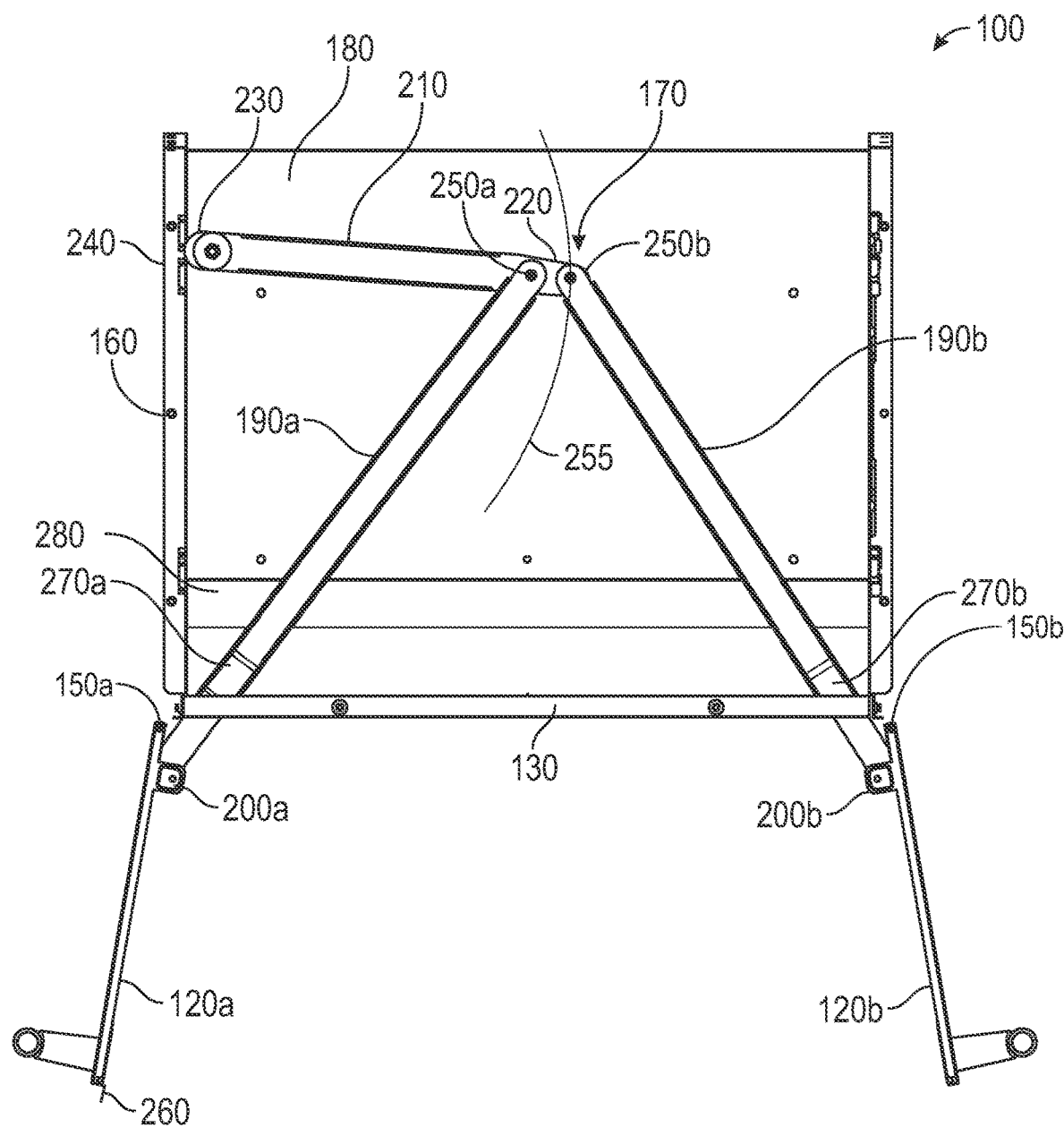

As shown in FIGS. 4A-4B, movement of one of the doors 120a, b causes a translation of the central linkage 170 by way of the first rigid elongated element 190a. Such translation of the central linkage 170 thereby generates a corresponding movement of the second rigid elongated element 190b which in turn moves the second oven door 120b. Accordingly, when the first door 120a is moved from a closed position in FIG. 4A to a fully open position in FIG. 4D by a user, the central linkage 170 translates towards the opening 130 of the oven enclosure 140 and the second door 120b is moved substantially in unison by the synchronizing mechanism. It will be understood that in some embodiments, the doors may be synchronized without moving in unison. For example, the doors 120a, b may be opened at the same time by way of the central linkage 170, but may move at different speeds during the opening or closing process.

As shown, a third rigid elongated element 210 is provided to support the central linkage 170. In the embodiment shown, the central linkage 170 is fixed to or is located on a first end 220 of the third rigid elongated element 210. For example, the central linkage 170 may be a section of the first end 220 of the third rigid elongated element 210. The second end 230 of the third rigid elongated element 210 is then fixed relative to the housing 160 of the enclosure 140 such that the central linkage 170 is located approximately centrally relative to the doors 120a, b when viewed from the front and a fixation point is spaced apart from the central linkage 170 by a length of the third rigid elongated element 210. In some embodiments, the second end 230 of the third rigid elongated element 210 is fixed at or adjacent a side wall 240 of the housing 160 of the enclosure 140 in order to maximize the length of the element. The translation of the central linkage 170 then corresponds to a pivot of the third rigid elongated element 210 about its second end 230.

It is noted that while the central linkage 170 is shown and described as being located approximately centrally relative to the doors 120a, b, it will be understood that in some embodiments, the central linkage may be offset from such a central location. For example, in some embodiments, the third rigid elongated element 210 may be further elongated, resulting in the central linkage 170 being offset relative to that shown in the drawings.

In the embodiment shown, the central linkage 170 comprises two pivot points 250a, b adjacent the first end 220 of the third rigid elongated element 210. Each of the first and second rigid elongated elements 190a, b then pivot relative to the central linkage 170 when either door 120a, b is opened or closed. Typically, the central linkage 170 is located at a central location between the hinged outer edges 150a, b when viewed from the front of the opening 130. As such, when one of the two doors 120a, b is opened or closed, the first and second rigid elongated elements 190a, b pivot in opposite directions relative to the central linkage 170.

It will be understood that while two distinct pivot points 250a, b are shown, in some embodiments, a single pivot point will be shared by the first and second rigid elongated elements 190a, b.

In embodiments, such as that shown, in which the central linkage 170 is mounted on or comprises the first end 220 of a rigid elongated element 210, the movement of the central linkage 170 during opening or closing of the doors 120a, b will follow an arc 255 about the second end 230 of the rigid elongated element. While the arc 255 will curve, it will approximate a translation perpendicular to the plane of the opening 130 of the enclosure 140.

Because the arced path of the central linkage 170 is intended to approximate a linear translation perpendicular to the plane of the opening 130, the third rigid elongated element 210 may be as long as possible within the context of the structure, and therefore typically terminates at the second end 230 at or adjacent the side wall 240 of the housing 160. By providing a longer elongated element 210, the arc traced by the first end 220 corresponds to a larger circle circumference, and thereby more closely approximates a linear translation. However, the second end 230 of the rigid elongated element 210 may be located elsewhere so long as it is fixed relative to the housing.

In embodiments where two distinct pivot points 250a, b are provided on the central linkage 170, different distances may exist between the second end 230 of the third rigid elongated element 210 and the corresponding pivot point. Because the third rigid elongated element 210 pivots about its second end 230, these different distances result in the pivot points 250a, b being at different radial distances of the arc 255 traveled by the first end 220 of the third rigid elongated element. As such, during rotation of the third rigid elongated element 110, each of the pivot points 250a, b travel a different distances as a function of the difference between their radial distances.

Without further adjustment, these different distances result in a different distance traveled and a different speed of the pivot points 250a, b, and as such each of the two doors 120a, b may open or close at different speeds in some embodiments. Further, because the doors are in symmetric position when fully closed, in some embodiments, the different speed of the doors opening may result in different and therefore asymmetric fully open positions for the two doors.

In alternative embodiments, the locations of the fixation points 200a, b on the doors 120a, b may be adjusted in order to account for this difference in distance. As such, the fixation point 200a of the first door 120a may be set a first distance from the hinged outer edge 150a of that door and the fixation point 200b of the second door 120b may be set a second distance from the hinged outer edge 150b of that door. The first door 120a may then be linked to the first pivot point 250a by way of a first rigid elongated element 190a, as shown, with the first pivot point 250a being set closer than the second pivot point 250b to the second end 230 of the third elongated element 210.

The second door 120b may then be linked to the second pivot point 250b by way of the second rigid elongated element 190b. Because the second pivot point 250b will cover a longer distance than the first pivot point 250a during any movement, as discussed above, the second distance between the fixation point 200b of the second door 120b and the hinged outer edge 250b of that door may be larger than the first distance between the fixation point 200a of the first door 120a and the hinged outer edge 250a of that door.

The difference between the first distance and the second distance, as well as the distance between each of the fixation points 200a, b and the corresponding hinged outer edges 250a, b, may be optimized based on the distance between the pivot points 250a, b and the length of the third rigid elongated element 210.

Further, in some embodiments, the different travel distance between the pivot points 250a, b may be accounted for by selecting a location for the first end 230 of third rigid elongated element 210 such that, during use, the different travel distances of the pivot points 250a, b are accounted for by a lateral offset between a starting point and a termination point of the arc traced by the central linkage 170. In such an embodiment, when viewed from the front of an oven utilizing the assembly, the termination point of the central linkage 170 may be set closer to the side wall 240 of the housing 160 at or adjacent the first end 230 of the third rigid elongated element 210. In the embodiment shown, the termination point would then be to the left of the starting point. In this way, the length of the rigid elongated elements 190a, b may be selected based on the resulting starting point and termination point of the arc traced by the central linkage 170.

By utilizing this strategy, the first and second doors 120a, b may move at different speeds during opening and closing, but the fully open and fully closed positions could still be identical.

As shown, the enclosure 140 is an oven and the doors 120a, b are oven doors. The assembly may be located outside of the housing 160 in order to avoid subjecting the assembly to conditions within the oven, such as extreme temperatures, cooking fumes, grease, and others, and to avoid interference by the assembly with airflow or the internal space of the oven. As such, the central linkage 170 may located outside of the enclosure 140 and adjacent the top surface 180 of the housing 160.

In some embodiments, a first of the two doors 120a further comprises a lip 260 for minimizing heat loss between the first door and the second door 120b when closed. In such an embodiment, the door synchronizing assembly may have a central linkage 170 configured to close the first door 120a immediately prior to the second door 120b such that the lip 260 is in place before the second door closes. In some embodiments, the lip 260 may be a gasket.

In the embodiment shown, the lip 260 is fixed to the first door 120a such that it extends from an inner surface of the first door and and seals against the inner surface of the second door 120b. In some alternative embodiments, the lip may instead be fixed to the first door 120a such that it extends from an outer surface of that door. In such an embodiment, the lip would seal against an outer surface of the second door 120b, and the central linkage 170 may then be configured to instead close the second door immediately prior to the closing the first door 120a.

In some embodiments, where the central linkage 170 is located outside of the enclosure 140, the central linkage is thereby above the top of the doors 120a, b when viewed from the front. In such embodiments, the first and second rigid elongated elements 190a, b may further comprise angled sections 270a, b, and the top surface 180 of the housing 160 may comprise a similar angled section 280. Such angled sections 270a, b, 280 thereby allow the rigid elongated elements 190a, b to link the fixation points 200a, b with the central linkage 170, while still allowing the central linkage 170 to translate horizontally when the doors 120a, b are opened or closed.

While the present disclosure has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the disclosure.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A door synchronizing assembly, the assembly comprising:
    two doors for closing an opening to an enclosure, each door having a hinged outer edge at which the corresponding door pivots relative to a housing of the enclosure and a fixation point;
    a central linkage adjacent a surface of the housing of the enclosure, the central linkage translatable substantially in a direction perpendicular to a plane of the opening of the enclosure; and
    first and second rigid elongated elements, each of the first and second rigid elongated elements linking the central linkage with the fixation point of a corresponding door of the two doors;
    wherein the movement of one of the two doors causes a translation of the central linkage which thereby generates a corresponding movement of the second of the two doors,
    wherein the central linkage is located on or is fixed to a first end of a third rigid elongated element, the third rigid elongated element being fixed at or adjacent a side wall of the housing of the enclosure at a second end, and wherein the translation of the central linkage corresponds to a pivot of the third rigid elongated element about its second end, and
    wherein the central linkage comprises two distinct pivot points adjacent the first end of the third rigid elongated element, wherein each of the first and second rigid elongated elements pivot relative to the central linkage at corresponding pivot points of the two distinct pivot points.

2. The door synchronizing assembly of claim 1, wherein, when one of the two doors is moved, the first and second rigid elongated elements pivot in opposite directions relative to the central linkage.

3. The door synchronizing assembly of claim 1, wherein the movement of the central linkage generated by the movement of one of the two doors is in an arc about the second end of the third rigid elongated element, and wherein the arc approximates a translation perpendicular to the plane of the opening of the enclosure.

4. The door synchronizing assembly of claim 3, wherein the central linkage comprises two pivot points adjacent the first end of the third rigid elongated element, where a first of the two pivot points is closer to the second end than a second of the two pivot points, and wherein each of the first and second rigid elongated elements pivot relative to a corresponding pivot point of the two pivot points, and wherein the two doors open at different speeds due to different radial distances of each of the pivot points from the second end of the third rigid elongated element.

5. The door synchronizing assembly of claim 3, wherein the central linkage comprises two pivot points adjacent the first end of the third rigid elongated element, where a first of the two pivot points is closer to the second end than the second of the two pivot points, and wherein each of the first and second rigid elongated elements pivot relative to a corresponding pivot point of the two pivot points, and a first distance between the fixation point of a first of the two doors and a hinged outer edge of the corresponding door is different than a second distance between the fixation point of a second of the two doors and a hinged outer edge of the corresponding door.

6. The door synchronizing assembly of claim 5, wherein the fixation point of the second door is linked to the second pivot point by the second rigid elongated element, and wherein the second distance is greater than the first distance.

7. The door synchronizing assembly of claim 1, wherein the fixation point of each door is adjacent the hinged outer edge of the corresponding door.

8. The door synchronizing assembly of claim 1, wherein the enclosure is an oven and the two doors are oven doors.

9. The door synchronizing assembly of claim 8, wherein the central linkage is outside of the enclosure and is adjacent a top surface of the housing of the enclosure.

10. The door synchronizing assembly of claim 8, wherein one of the two doors further comprises a lip for sealing the one of the two doors against the second of the two doors, and wherein the central linkage is configured to close the one of the two doors comprising the lip before closing the second of the two doors.

11. The door synchronizing assembly of claim 10, wherein the lip is located at an inner surface of the one of the two doors comprising the lip.

12. The door synchronizing assembly of claim 8, wherein one of the two doors further comprises a lip for sealing the one of the two doors against the second of the two doors, and wherein the central linkage is configured to close the one of the two doors comprising the lip after closing the second of the two doors.

13. The door synchronizing assembly of claim 12, wherein the lip is located at an outer surface of the one of the two doors comprising the lip.

* * * * *